Dec. 28, 1948. W. J. HALL 2,457,147
BEAM
Filed Dec. 29, 1943

INVENTOR.
William J. Hall.
BY
*Harness, Dickey & Pierce*
ATTORNEYS.

Dec. 28, 1948.  W. J. HALL  2,457,147
BEAM
Filed Dec. 29, 1943
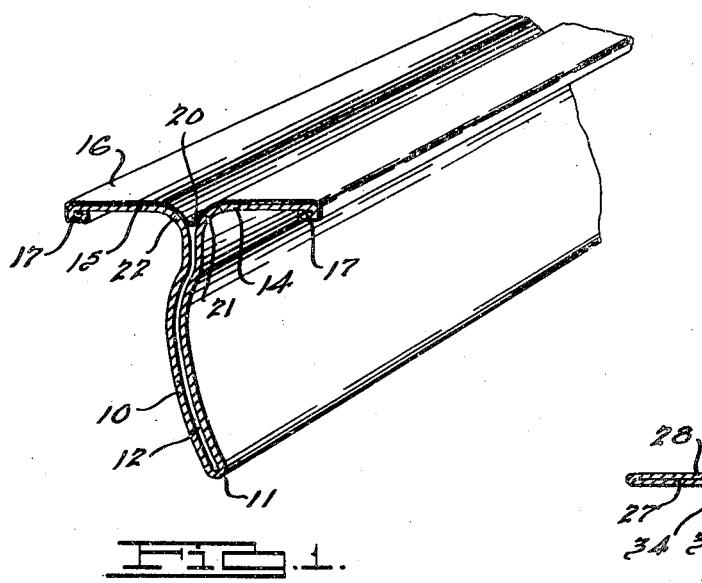
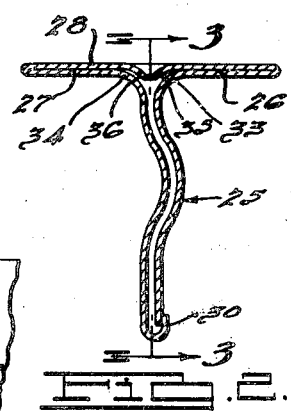
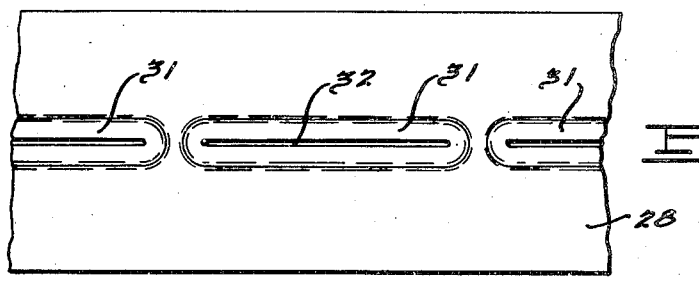
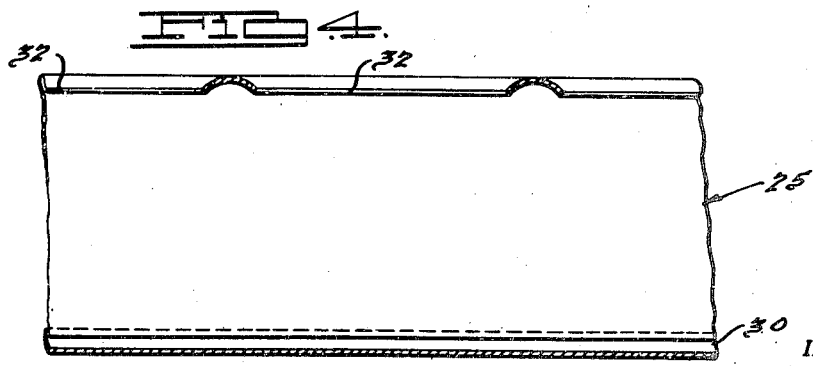
INVENTOR.
William J. Hall.
BY
Harness, Dickey & Pierce
ATTORNEYS.

Patented Dec. 28, 1948

2,457,147

UNITED STATES PATENT OFFICE 2,457,147

BEAM

William J. Hall, Detroit, Mich., assignor, by mesne assignments, to Great Lakes Steel Corporation, Detroit, Mich., a corporation of Delaware Application December 29, 1943, Serial No. 516,001

1 Claim. (Cl. 189—37)

The invention relates to building materials or structures and it has particular relation to steel or metal beams.

In many types of buildings where nails are driven, steel beams are employed having so-called nailing grooves which receive the driven nail and clinch it in position. This clinching is sometimes effected at the end of the nail, but in most instances the nail is bent intermediate its ends so as to positively prevent its withdrawal. A nailing groove which will effect these results is fundamentally necessary and consequently the beam must be made with laminations in order to provide the nailing groove or place for the nail to enter. Because of these requirements, it is usual to manufacture such beams out of two or more pieces and to assemble and connect them.

One object of the present invention is to provide an improved type of nailing beam which may be manufactured less expensively, while still obtaining a structure into which nails may be easily driven and positively anchored.

Another object of the invention is to provide an improved nailing beam such as indicated which mainly can be constructed from one piece of beam material so as therefore to eliminate expensive assembling operations.

Another object of the invention is to provide an improved and extremely strong metal beam which is characterized by the fact nails may be easily driven into the beam without requiring more than ordinary manual effort.

Other objects of the invention will become apparent from the following description, from the drawing to which it relates and from the claim hereinafter set forth.

For a better understanding of the invention reference may be had to the accompanying drawings wherein.

Figure 1:
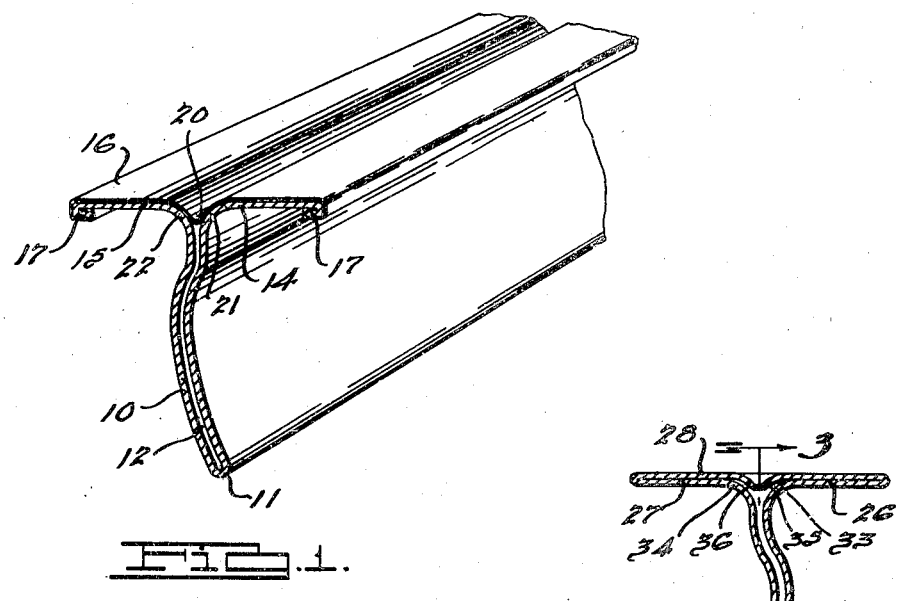
Figure 1 is a cross-sectional and perspective view illustrating a nailing beam constructed according to one form of the invention.

Referring to Figure 1, the beam illustrated comprises a strip of steel which is rolled to form a laminated web portion 10 having one edge closed as indicated at 12 by bending the strip intermediate its edges. The web or leg portions 10 are formed with a space 12 for receiving nails and are corrugated with the ridge of one corrugation extending toward the valley of the complementary corrugation in the manner shown so that a nail driven into the groove or space 12 is positively anchored in position through bending of the nail and by contact of the nail with sides of the corrugations.

At the edge opposite the reverse bend 11, the laminations of the web respectively are joined to oppositely directed flanges 14 and 15 so as to form a generally T-shape structure. In order to connect the flanges across the nail groove or space 12, a puncturable cover strip 16 is disposed over the upper face of the flanges 14 and 15 and for positively connecting the strip and flanges together, opposite edges of the strip are anchored to the outer edges of the flanges by reverse folding as indicated at 17. At its center the cover strip 16 is formed with a V-shaped depression 20 extending over the nailing groove 12 and it will be observed that the flanges 14 and 15 are outwardly flared at 21 and 22 and that the depression 20 substantially fits such flare.

The cover strip 16 is constructed from relatively thin metal as compared to the metal stripping in the beam proper and as an example of relative thickness, the beam metal may be .040 of an inch thick and the cover .010 of an inch thick. The metal employed may be cold rolled steel of low carbon character and it will be readily understood by those skilled in the art that various suitable steels may be used. It is to be noted in particular, however, that the thinness of the cover 16 is such that nails may be readily driven through the bottom of the V-shaped portion 20. Since this V-shaped portion also serves as a nail guide, nails may be driven readily through an element disposed on the beam and then into the depression and through the thin bottom metal and into the nailing groove.

A strong beam may thus be made out of much thinner gage stock while still having a solid and connected upper side through which nails may be readily driven. It may be mentioned also that the depression in the cover acts to normally hold the laminations of the web 10 in properly spaced relation, while still providing a certain resiliency which permits the web to spread, if necessary, as where larger nails are used. In other words, the V-shaped depression acts normally as a sufficiently strong holding and connecting means at the upper edge of the web, while still providing a nail guiding depression and portion which is resilient so as to allow some lateral spreading between the laminations of the web and so as to permit larger manufacturing tolerances. Consequently, this beam is particularly adapted for accommodating a wider range of nail sizes and this is especially important in actual use since in many cases the right size nail is not at hand. It is evident that the beam can be manufactured readily by rolling the heavier steel to the shape shown, then rolling the cover strip either in place or separately and subsequently placing it in position and then folding the edges of both strips to form the edge locking means 17. It might be mentioned finally that instead of using a thin steel cover 16, other suitable material can be used, such, for instance, as a plastic.

Figure 2:
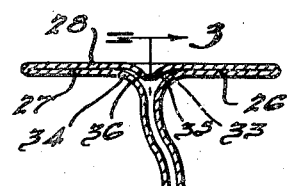
Figure 2 is a cross-sectional view of a nailing beam constructed according to another form of the invention.
Figure 4:
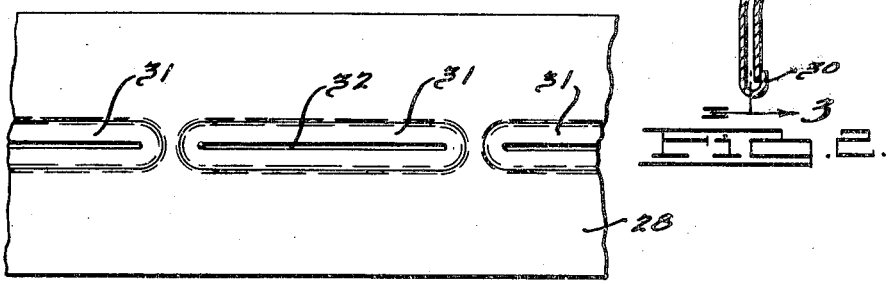
Figure 4 is a plan view of the structure shown by Figure 2.
Figure 3:
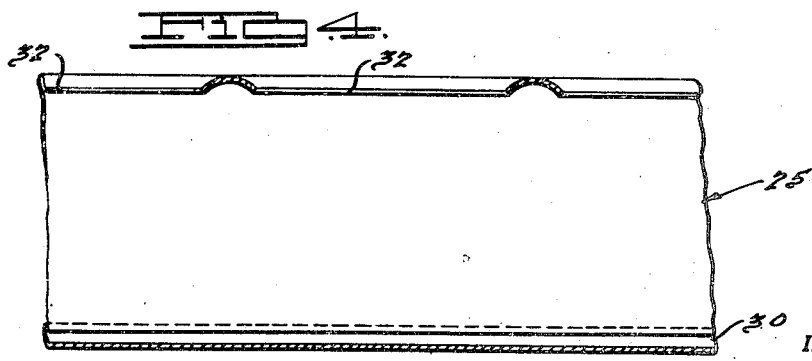
Figure 3 is a cross-sectional view taken substantially along the line 3—3 of Figure 2.

In the structure shown by Figure 2, the beam is made entirely from one thickness of steel such as indicated. The strip is bent to form the web indicated at 25, laminated flanges 26 and 27 with the flanges through reverse bending of the metal so as to provide an integral outer cover 28. At the lower edge of the web 25 the two laminations are locked together by providing an excess length on one lamination and bending it into engagement with the other leg as indicated at 30.

In order to provide a nail guiding groove or depression and at the same time to facilitate driving the nail through and into the nail groove, considering the fact the metal is of heavier gage, the cover portion 28 is formed with spaced depressions of V-shape as shown at 31 and the bottom of each depression is formed with a slit 32. Hence, a nail driven downwardly into the depression 31 enters the slit 32 and the metal at opposite sides of the slit will expand as required to enable the nail to pass on into the nailing groove. Attention is directed to the fact that the depressions are disposed over outwardly flared portions 33 and 34 at the upper edge of the web 25 and that spaces 35 and 36 are provided between the sides of the depression and such flaring portions. Hence, the sides of the depressed portion and the web, too, may spread and expand to accommodate nails driven into the nailing groove. This space thus allows for substantial range in size of nails since the metal can expand substantially in order to accommodate varying sizes of nails.

Although more than one form of the invention has been illustrated and described in detail, it will be apparent to those skilled in the art that various modifications may be made without departing from the scope of the appended claim.

What is claimed is:

A metal nailing beam comprising a relatively thicker piece of strip steel rolled to form parallel webs connected along one edge by a reverse bend in the strip and having a flange directed laterally from the other edge of each web to form a T-shape beam, said flanges having their inner portions flaring outwardly to form an elongated nail guiding depression, and a cover strip of relatively thinner, puncturable metal overlying the outer faces of the flanges and the depression between the flanges, said cover strip being connected to the flanges and connecting the strip and flanges together and including an elongated, continuous depression nesting in the first mentioned depression with the side walls of the depression in said cover strip contacting the sides of the depression formed by the flanges and resiliently holding the webs in predetermined spaced relation to form a nail receiving slot therebetween while permitting limited spreading of the webs when a nail larger than the slot is driven into the slot between the webs.

WILLIAM J. HALL.

REFERENCES CITED

The following references are of record in the file of this patent:

UNITED STATES PATENTS

| Number | Name | Date |
| --- | --- | --- |
| 1,253,216 | Day | Jan. 15, 1918 |
| 1,906,096 | Priddy | Apr. 25, 1933 |
| 1,964,403 | Loucks | June 26, 1934 |
| 2,063,714 | Waugh et al. | Dec. 8, 1936 |
| 2,112,480 | Coddington | Mar. 29, 1838 |
| 2,126,962 | Hurlbert, Jr. | Aug. 16, 1938 |
| 2,225,574 | Thomson | Dec. 17, 1940 |

FOREIGN PATENTS

| Number | Country | Date |
| --- | --- | --- |
| 743,672 | France | Jan. 16, 1933 |